Figure 1:
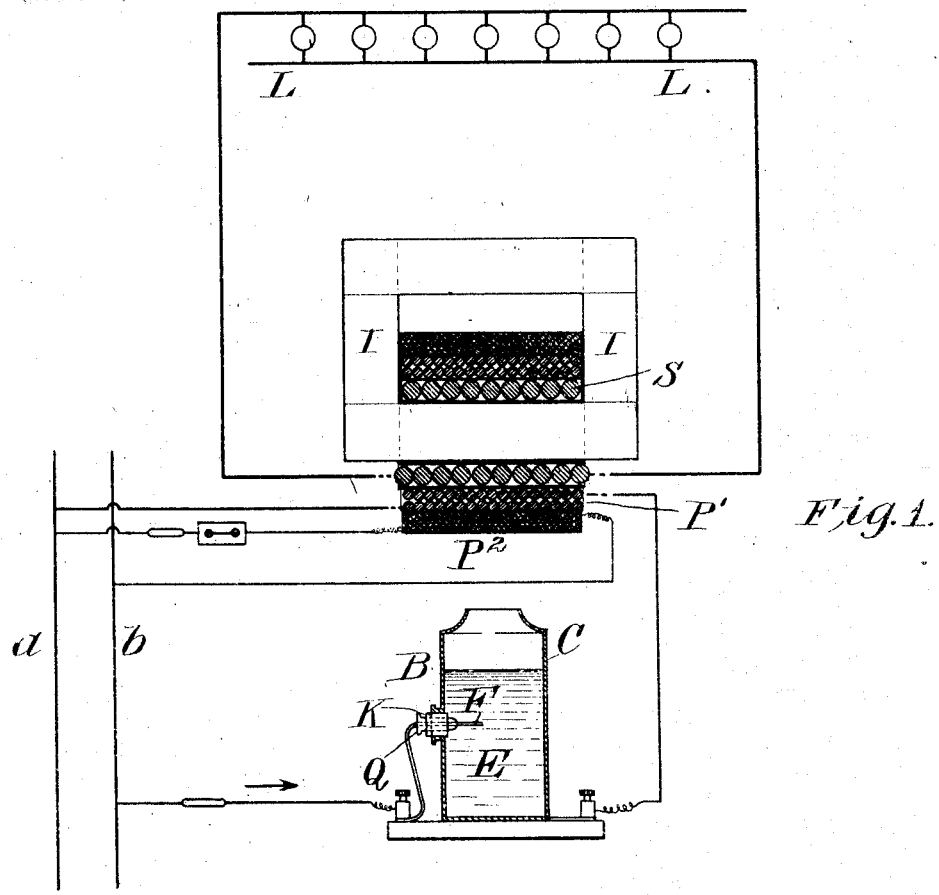

No. 666,162. Patented Jan. 15, 1901.
E. THOMSON.
TRANSFORMING APPARATUS FOR ELECTRIC METAL WORKING.
(Application filed July 3, 1899.)
(No Model.)

WITNESSES
Henry O. Westendarp
H. St. Capel.

INVENTOR
E. Thomson
By F. L. Townsend
Atty.

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF LYNN, MASSACHUSETTS.

TRANSFORMING APPARATUS FOR ELECTRIC METAL-WORKING.

SPECIFICATION forming part of Letters Patent No. 666,162, dated January 15, 1901.

Application filed July 3, 1899. Serial No. 722,647. (No model.)

*To all whom it may concern:*

Be it known that I, ELIHU THOMSON, a citizen of the United States, and a resident of Swampscott, in the county of Essex and State of Massachusetts, have invented a certain new and useful Transforming Apparatus for Electric Metal-Working, of which the following is a specification.

The present invention relates to a novel form of transforming apparatus particularly adapted to the employment of continuous currents as taken from ordinary supply-mains, such as those fed at two hundred and twenty volts or one hundred and ten volts.

The main object of my invention is to obtain from direct-current mains the effects of alternating currents in secondary circuits and by the use of closed iron cores adjusted, if required, for magnetization with relatively low ampere-turns on account of the high permeability of the magnetic circuit which they provide.

By my invention I am able to secure the reversal of the magnetism or at least such a change of magnetism as would not otherwise take place, it being well known that a closed iron core tends to maintain its magnetism even if the magnetizing-current is broken or cut off.

My invention, as will be pointed out, enables electric welding machinery and similar electric metal-working apparatus to be operated by transformation from direct-current mains and by the use of closed iron circuit-cores in the transformer.

My invention consists, substantially, in maintaining in any desired manner a continuous magnetic polarization or tendency to magnetic polarization of one sign or direction and in intermittently operating on such field of magnetism by current from a continuous-current source acting on said field in the opposite direction and with power sufficient to not only overcome the continuously-acting polarizing influence, but to reverse the polarity of the core, thereby generating alternating currents in a closed circuit secondary within the field affected. The constant magnetic polarization or tendency may be produced by permanent magnetism or by a coil in which a continuous current flows. I have shown and described a coil for this purpose, and said coil is herein termed a "supplemental" coil.

As realized in a closed magnetic circuit-transformer, my invention involves the employment of a rapid interrupter of continuous current through one coil of the transformer, which may be called the "interrupted" primary, an opposing polarizing-coil wound in opposition thereto (termed the "supplemental" or "depolarizing" coil) and kept in circuit continually, and a third coil or winding constituting the ordinary secondary and separated from the other two to receive the flow of induced currents. I have described as a form of interrupter to be used in this connection that which is now known as the "Wehnelt," consisting of a surface of platinum or other metal made an anode in an electrolyte, the cathode being a surface of lead or other metal to a considerable extent in the same electrolyte. Other forms of rapid interrupters may be substituted, if desired.

Figure 2:
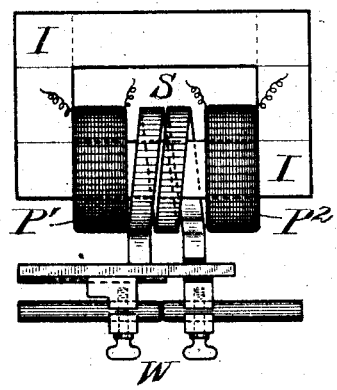

In the accompanying drawings, Figure 1 is a diagram of circuits and apparatus illustrating the principle of my invention and the application of the secondary currents to lighting. Fig. 2 illustrates my invention as embodied in an electric welding or similar metal-working transformer.

In Fig. 1 the frame I I represents the closed core of the transformer or the iron magnetic circuit. Coil S, wound around the core, is the secondary, which is shown as carrying a load of lights L L or other working resistance. Coil P, wound around the core I I, is the interrupted primary, taking its current from the mains *a b*, which may be at one hundred and ten volts or other potential, through an interrupter B, consisting in the figure of a leaden bottle or case C, with an opening at the top, partly filled with electrolyte E, such as sulfuric acid with a specific gravity of 1.2, and having a rubber cork K, through which is inserted a glass or porcelain piece surrounding a platinum or other metal electrode F. The porcelain piece is marked Q. The course of the current is from main *b* through the interrupter, making the platinum F an anode and the case C a cathode, and thence from the primary coil P' to a, the negative main. The interrupter of course can be put in any other part of this circuit connection. A supplemental coil P² in an uninterrupted circuit is shown as wound outside of P', and its purpose is, when the primary P' is interrupted, to act magnetically to polarize the core I I in the direction opposite to that which the current in P' gives when the circuit through P' is completed. To this end, the ampere-turns of P' should be considerably in excess of those in P² when both coils are in action, so that when coil P' is traversed by current the core I I is polarized in one direction or tends to be so polarized, and when coil P² is in action and P' interrupted the core shall reverse its magnetism or at least undergo a great change in its magnetic state.

In Fig. 2, S is shown as having but two turns around the core I I and with electric welding-clamps for holding the work W attached to its terminals in the usual manner. Suitable switches, fuses, &c., are of course employed in these various connections from the supply-mains for controlling the times or intervals of action.

The invention claimed is—

1. In an electric metal-working apparatus, the combination with a closed magnetic circuit-transformer having a secondary whose terminals are furnished with electric metal-working clamps, of means for imparting a continuous polarizing tendency to the core of said transformer of one sign and a primary for said transformer fed with a rapidly-interrupted continuous current of power sufficient to overcome the continuous polarizing tendency and to thereby produce rapid reversals of magnetism in the core.

2. The combination in a transformer of a polarizing-coil continuously operating, and a primary coil fed with a rapidly-interrupted continuous current of power sufficient to overcome the effects of the said polarizing-coil and reverse the magnetism of the transformer, as and for the purpose described.

Signed at Lynn, in the county of Essex and State of Massachusetts, this 6th day of June, A. D. 1899.

ELIHU THOMSON.

Witnesses:
DUGALD McKILLOP,
HENRY O. WESTENDARP.